US012649450B2

(12) United States Patent (10) Patent No.: US 12,649,450 B2
Prodduturi et al. (45) Date of Patent: Jun. 9, 2026

(54) AUXILIARY BRAKING SYSTEM FOR A WORK VEHICLE

(71) Applicant: CNH Industrial America LLC, New Holland, PA (US)

(72) Inventors: Shivakumar Prodduturi, Naperville, IL (US); Corrado Iotti, Ann Arbor, MI (US)

(73) Assignee: CNH Industrial America LLC, New Holland, PA (US)

( * ) Notice: Subject to any disclaimer, the term of this patent is extended or adjusted under 35 U.S.C. 154(b) by 766 days.

(21) Appl. No.: 18/085,865

(22) Filed: Dec. 21, 2022

(65) Prior Publication Data

US 2024/0208476 A1      Jun. 27, 2024

(51) Int. Cl.
  *B60T 13/58*        (2006.01)
  *B60T 13/02*        (2006.01)
(52) U.S. Cl.
  CPC ............ *B60T 13/588* (2013.01); *B60T 13/02* (2013.01); *B60T 2270/402* (2013.01)
(58) Field of Classification Search
  CPC .......... B60T 13/588; B60T 7/12; B60T 13/02; B60T 2270/402; B60T 11/046; B60T 11/102; B60T 15/041
  See application file for complete search history.

(56) References Cited

U.S. PATENT DOCUMENTS 5,119,912 A  *  6/1992  Martin ..................... B60T 1/005
                                                       192/221
5,180,038 A  *  1/1993  Arnold .................. B60T 13/746
                                                       74/89.37

7,513,341 B2    4/2009  Lachermeier
7,832,813 B2   11/2010  Bensch et al.
7,905,556 B2    3/2011  Huber et al.
9,573,577 B2    2/2017  Hilberer et al.
              (Continued)

FOREIGN PATENT DOCUMENTS

DE        3605444 A1     9/1986
EP        0020862 B1     5/1982
              (Continued)

OTHER PUBLICATIONS

European Patent No. EP 2455265 to Chancelier et al.published on May 23, 2012.*

(Continued)

*Primary Examiner* — Pamela Rodriguez
(74) *Attorney, Agent, or Firm* — Dority & Manning, P.A.

(57)                ABSTRACT

In one aspect, an auxiliary braking system for a work vehicle including a traction device may include a brake assembly being configured for slow movement of the traction device. The system may also include an auxiliary braking actuator configured to selectively activate the brake assembly during auxiliary braking operations. Furthermore, the system may include a cable coupled to the brake assembly and one end of the cable assembly including an enlarged head slidably positioned within a chamber of an auxiliary braking actuator, wherein, when a service braking actuator activates the brake assembly, the enlarged head is configured to slide within the chamber. Finally, the system may include a fastener assembly to retain the enlarged head within the chamber.

18 Claims, 7 Drawing Sheets

(56)                    References Cited

U.S. PATENT DOCUMENTS

| 10,501,062 B2 | 12/2019 | Wulf | |
| 2008/0157587 A1* | 7/2008 | Huang ................... | B60T 7/042 |
| | | | 303/20 |

FOREIGN PATENT DOCUMENTS

| EP | 1923286 B1 | 7/2011 |
| EP | 1923284 B1 | 3/2016 |
| WO | WO 2004/002799 | 1/2004 |
| WO | WO 2010/003854 | 1/2010 |
| WO | WO 2022/122433 | 6/2022 |

OTHER PUBLICATIONS

European Patent No. EP 2457787 to Sano et al.published on May 30, 2012.*
Hydraulic Trailer Brake Cylinder Internal spring 25 mm Tractor / Agricultural Spare Parts Holland 2022 (1 page) https://www.ebay.com/itm/393212431822.

* cited by examiner

AUXILIARY BRAKING SYSTEM FOR A WORK VEHICLE

FIELD OF THE INVENTION

The present disclosure generally relates to work vehicles and, more particularly, to an auxiliary braking system for a work vehicle.

BACKGROUND OF THE INVENTION

It is well known that, to slow or stop the movement of a tractor or other work vehicle, a braking force must be applied to the work vehicle. Traditionally, operators use various manual input devices to apply a braking force to slow or stop the movement of a work vehicle. For example, the operator may use a foot pedal to apply a service braking force to the work vehicle and a hand lever for applying an auxiliary braking force to the work. Recently, autonomous work vehicles have been developed. Such autonomous work vehicles can be controlled without the presence of an operator within the cab. Thus, the operator is not available to actuate the manual input devices for slowing the work vehicle.

Accordingly, an improved auxiliary braking system for a work vehicle would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to an auxiliary braking system for a work vehicle including a brake assembly. Furthermore, the auxiliary braking system includes an auxiliary braking actuator configured to selectively activate the brake assembly during auxiliary braking operations. In this respect, the auxiliary braking actuator includes a rod having a first end and second end opposed to the first end. In addition, the first end of the rod defines a chamber. Furthermore, the auxiliary braking system includes a cable assembly. In this respect, the cable assembly includes a first end and a second end opposed to the first end. In addition, the second end of the cable assembly is coupled to the brake assembly. Additionally, the first end of the cable assembly includes a first enlarged head slideably positioned within the chamber. Furthermore, the auxiliary braking system includes a fastener assembly coupled to the rod to retain the first enlarged head within the chamber. Furthermore, when a service braking actuator activates the brake assembly of the auxiliary braking system, the first enlarged head is configured to slide within the chamber.

In another aspect, the present subject matter is directed to a work vehicle including a traction device. Furthermore, the work vehicle includes a brake assembly. In this respect, the brake assembly is configured to slow movement of the traction device. Furthermore, the work vehicle includes a service braking actuator. In this respect, the service braking actuator is configured to activate the brake assembly during service braking operations.

Furthermore, the work vehicle includes an auxiliary braking actuator. In this respect, the auxiliary braking actuator is configured to selectively activate the brake assembly during auxiliary braking operations. In addition, the auxiliary braking actuator includes a rod having a first end and a second end opposed to the first end. In addition, the first end of the rod defines a chamber. Furthermore, the work vehicle includes a cable assembly. In this respect, the cable assembly includes a first end and a second end opposed to the first end. In addition, the second end of the cable assembly is coupled to the brake assembly. Additionally, the first end of the cable assembly includes a first enlarged head slideably positioned within the chamber. Additionally, the cable assembly includes a fastener assembly coupled to the rod to retain the first enlarged head within the chamber. Furthermore, when a service braking actuator activates the brake assembly of the auxiliary braking system, the first enlarged head is configured to slide within the chamber. These and other features, aspects and advantages of the present technology will become better understood with reference to the following description and appended claims. The accompanying drawings, which are incorporated therein and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
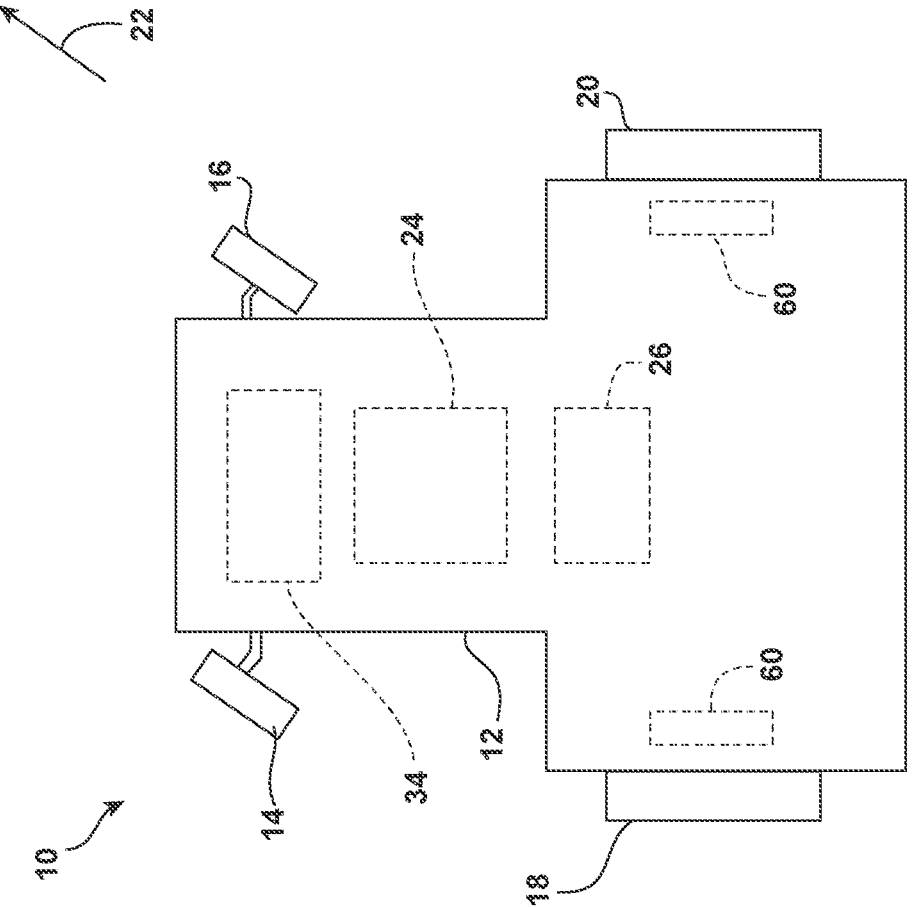
FIG. 1 illustrates a top view of one embodiment of a work vehicle in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield still a further embodiment. Thus, it is intended that the present invention covers such modifications and variations as come within the scope of the appended claims and their equivalents.

In general, the present subject matter is directed to an auxiliary braking system for a work vehicle. More specifically, the auxiliary braking system includes an auxiliary braking actuator configured to selectively activate a brake assembly of the work vehicle during auxiliary braking operations. The brake assembly is, in turn, configured to slow movement of a traction device(s) of the work vehicle. In several embodiments, the auxiliary braking actuator is automatically controlled (e.g., by a suitable computing system). For example, in one embodiment, the auxiliary braking actuator is a spring-loaded cylinder configured to activate the brake assembly during auxiliary braking operations, such as when the work vehicle is stopped on an inclined surface. In this respect, the auxiliary braking actuator includes a rod having a first and second end, with the first end of the rod extending outward from the actuator and defining a chamber.

Additionally, in several embodiments, the auxiliary braking system includes a cable assembly including a first and second end. The first end of the cable assembly includes a first enlarged head that is slideably positioned within the chamber of the auxiliary braking actuator. Additionally, in several embodiments, the second end of the cable assembly is coupled to the brake assembly. In this respect, during service braking operations (e.g., when the reducing the ground speed of the work vehicle during operation), a separate service braking actuator activates the brake assembly. Such activation of the brake assembly, in turn, causes movement of the cable assembly relative to the auxiliary braking actuator. Thus, the first enlarged end of the cable assembly can slide within the chamber to accommodate movement the such movement of the cable assembly during service braking operations.

Figure 2:
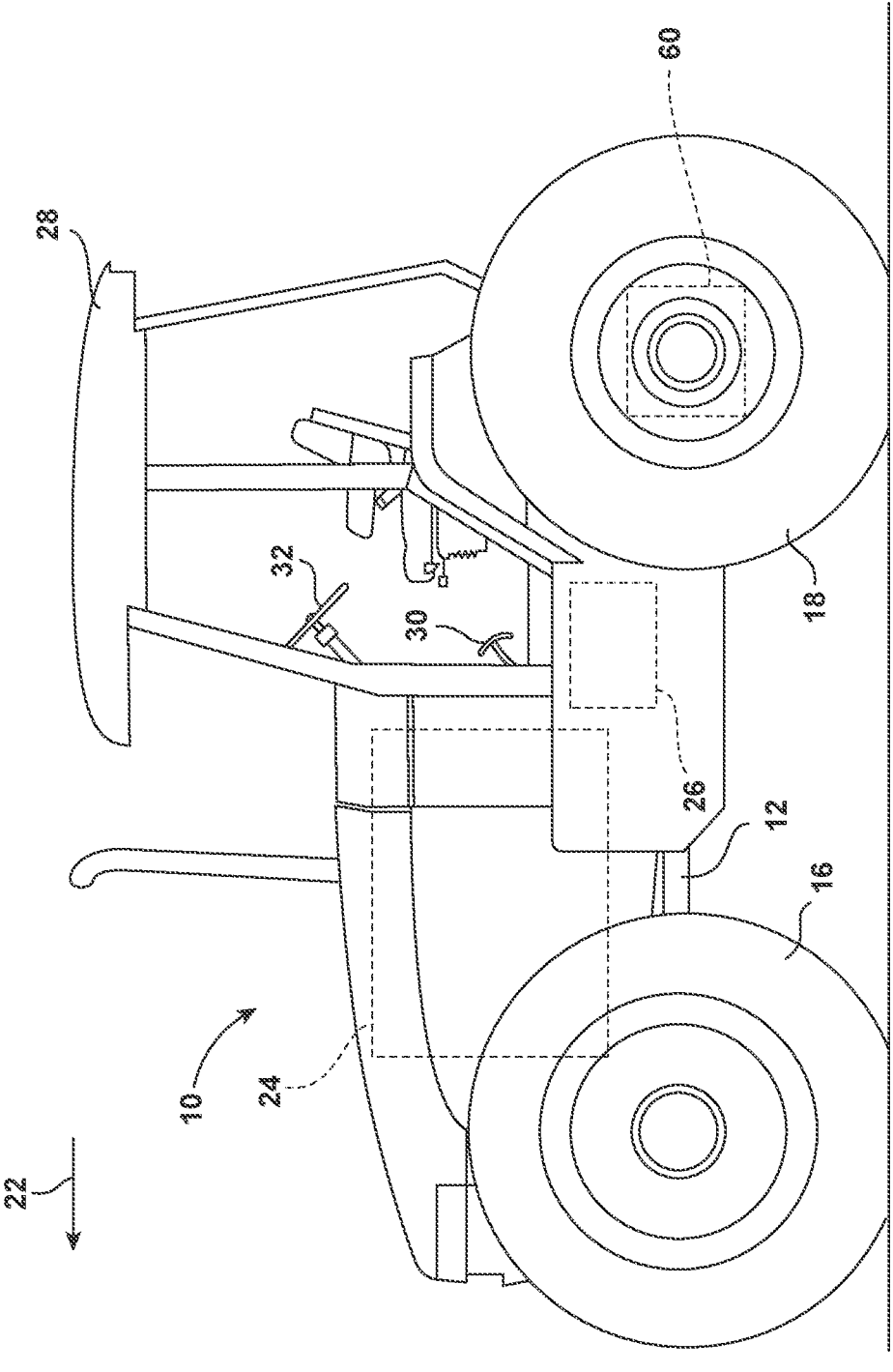
FIG. 2 illustrates a side view of the work vehicle shown in FIG. 1, particularly illustrating various components of the work vehicle in accordance with aspects of the present subject matter.

Referring now to the drawings, FIGS. 1 and 2 illustrate differing views of one embodiment of a work vehicle 10 in accordance with the present subject matter. More specifically, FIGS. 1 and 2 illustrate top and side views of the work vehicle 10, respectively.

As shown, in the illustrated embodiment, the work vehicle 10 is configured as an agricultural tractor. However, in other embodiments, the work vehicle 10 is configured as any other suitable agricultural or other type of work vehicle, such as an agricultural harvester, an agricultural sprayer, a construction vehicle, and/or the like.

As shown in FIGS. 1 and 2, the work vehicle 10 includes a frame or chassis 12 configured to support or couple to a plurality of components. Specifically, in several embodiments, the work vehicle 10 includes one or more traction devices coupled to the frame 12. For example, in the illustrated embodiment, the work vehicle 10 includes a pair of steerable front wheels 14, 16, and a pair of driven rear wheels 18, 20 coupled to the frame 12. The wheels 14, 16 are, in turn, configured to support the work vehicle 10 relative to the ground and move the vehicle 10 in a direction of travel (e.g., as indicated by arrow 22) across a field. In this regard, the work vehicle 10 includes an engine 24 and a transmission 26 mounted on the frame 12. The transmission 26 is operably coupled to the engine 24 and provides variably adjusted gear ratios for transferring engine power to the driven wheels 18, 20. Additionally, an operator's cab 28 (FIG. 2) is supported by a portion of the frame 12 and may house various input devices, such as a brake pedal 30 (FIG. 2) and a steering wheel 32 (FIG. 2), for permitting an operator to control the operation of one or more components of the work vehicle 10. However, in alternative embodiments, the work vehicle 10 may include any other suitable component(s) coupled to or supported on the frame 12. For example, in one alternative embodiment, the front wheels 14, 16 may be driven in addition to, or in lieu of, the one or more rear wheels 18, 20.

Furthermore, in several embodiments, the work vehicle 10 includes one or more brake assemblies 60. In general, the brake assembly(ies) 60 is configured to reduce the ground speed of or otherwise slow the movement of the work vehicle 10. For example, in the illustrated embodiment, the work vehicle 10 includes a braking assembly 60 provided in association with each of the driven wheels 18, 20. In this regard, when activated, the braking assemblies 60 reduce the wheel speed of or otherwise slow the rotation of the wheels 18, 20. However, in alternative embodiments, braking assemblies 60 may be provided in operative association with the front wheels 14, 16 in addition to or in lieu of the rear wheels 18, 20.

In general, the brake assembly(ies) 60 is configured to be activated during both service braking operations and auxiliary braking operations of the work vehicle 10. A service braking operation occurs when the braking assembly(ies) 60 is engaged to reduce the ground speed of the work vehicle 10, such as when the work vehicle 10 needs to be slowed to make a turn or avoid an obstacle. In one embodiment, the brake pedal 30 may be used by the operator of the work vehicle 10 to initiate service braking operations. Alternatively, service braking operations may be initiated automatically.

Conversely, auxiliary braking operations correspond to engagement of the braking assemblies 60 occurring at times other than during service braking operations. For example, engagement of the braking assemblies 60 to prevent movement of the work vehicle 10 when parked on a hill or other inclined surface constitutes an auxiliary braking operation. As another example, engagement of the braking assemblies 60 to reduce the ground speed of the work vehicle 10 to make a turn or avoid an obstacle in lieu of service braking operations constitutes an auxiliary braking operation. As still a further example, engagement of the braking assemblies 60 to reduce the ground speed of the work vehicle 10 when service braking operations are unavailable constitutes an auxiliary braking operation.

Additionally, it should be appreciated that the braking assemblies 60 correspond to any suitable device(s) for reducing the wheel speeds of the wheels 18, 20, such as by converting energy associated with the movement of such wheels 18, 20 into heat. For example, in one embodiment, the braking assemblies 60 correspond to a suitable fluid-driven cylinder(s) (not shown), such as a hydraulic cylinder(s), configured to push stationary frictional elements (not shown), such as brake shoes or brake calipers, against rotating elements (not shown), such as brake drums or brake discs. However, it should be appreciated that the braking assemblies 60 correspond to any other suitable hydraulic, pneumatic, mechanical, and/or electrical components configured to convert the rotation of the rotating elements into heat.

Figure 3:
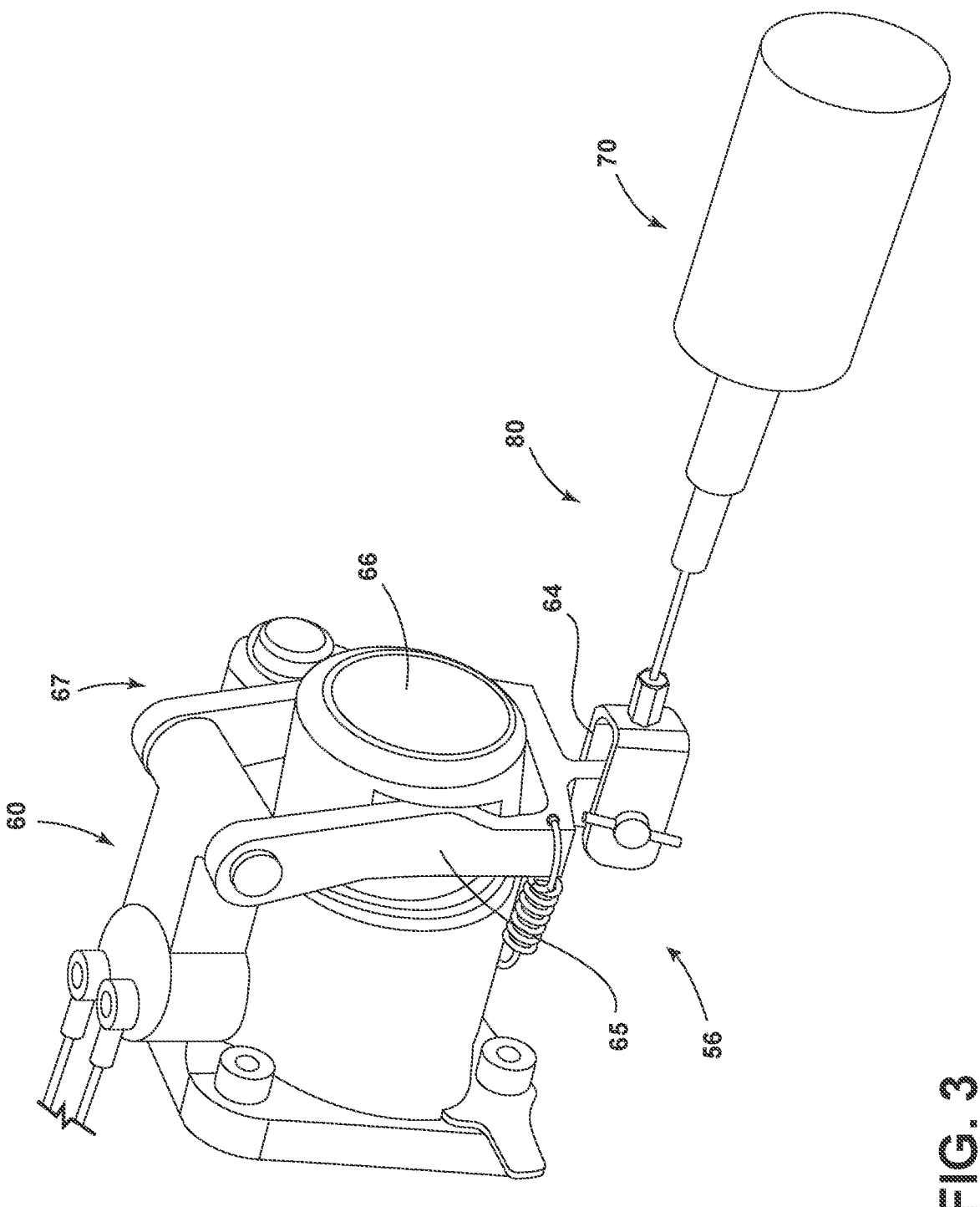
FIG. 3 illustrates a perspective view of one embodiment of an auxiliary braking system for a work vehicle in accordance with aspects of the present subject matter.

FIG. 3 illustrates a perspective view of one embodiment of an auxiliary braking system 56 of a work vehicle 10. In general, the auxiliary braking system 56 is configured to activate the braking assembly(ies) 60 during auxiliary braking operations. Specifically, in several embodiments, the auxiliary braking system 56 includes an auxiliary braking actuator 70 and a cable assembly 80. The cable assembly 80 is coupled between the auxiliary braking actuator 70 and a brake valve 66 associated with the braking assembly(ies) 60.

For example, in one embodiment, the cable assembly 80 may include a clevis 64 that is coupled to an actuation arm 65 of the brake valve 66. In this respect, the cable assembly 80 is configured to transmit movement of the auxiliary braking actuator 70 to the brake valve 66. Such movement actuates the brake valve 66 (e.g., by pivoting the actuation arm 65 of the brake valve 66), which, in turn, supplies brake fluid to the braking assembly(ies) 60 such that the auxiliary braking operation is performed.

Figure 4:
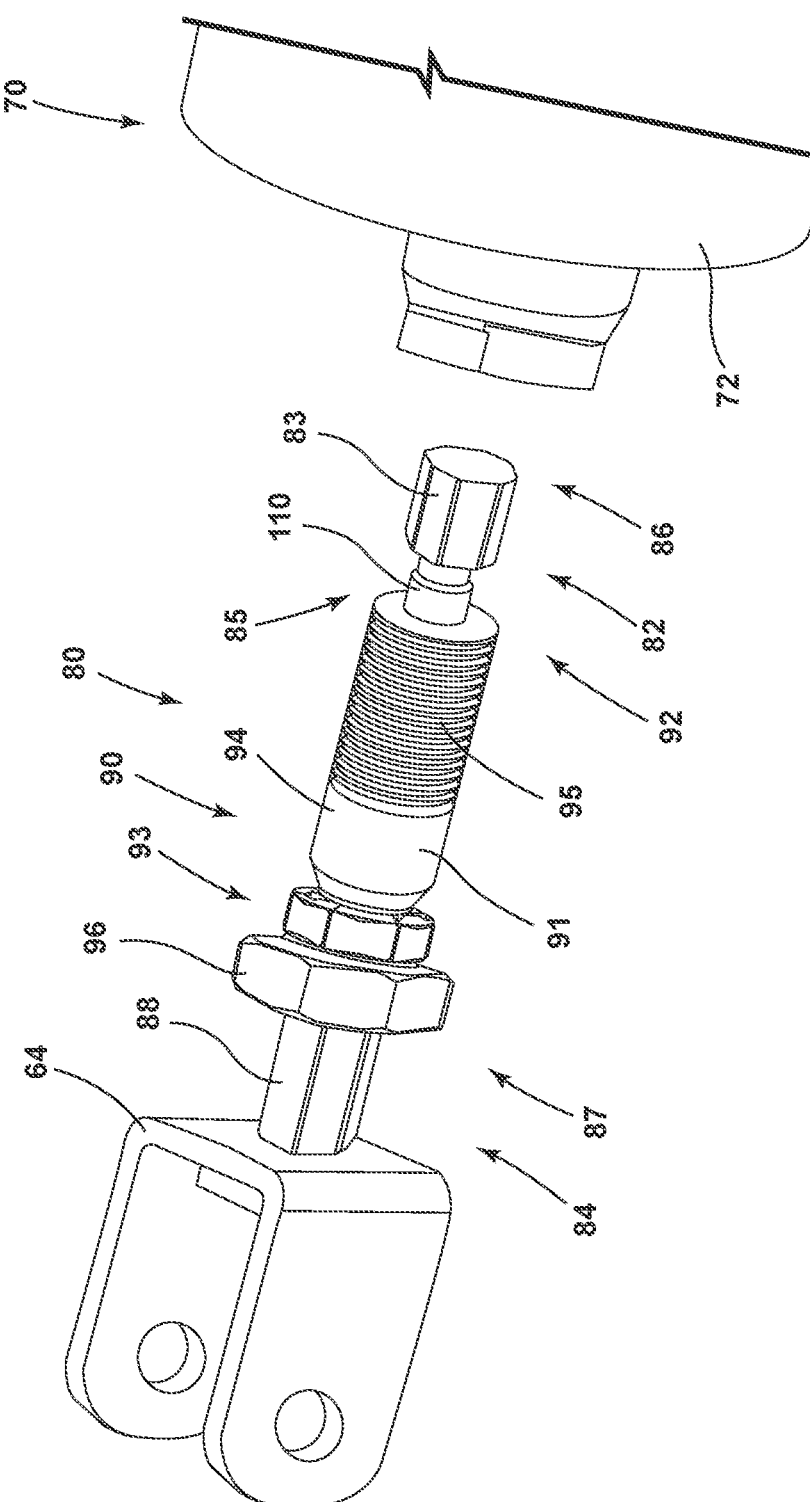
FIG. 4 illustrates a partial, exploded perspective view of one embodiment of an auxiliary braking system for a work vehicle in accordance with aspects of the present subject matter.
Figure 5:
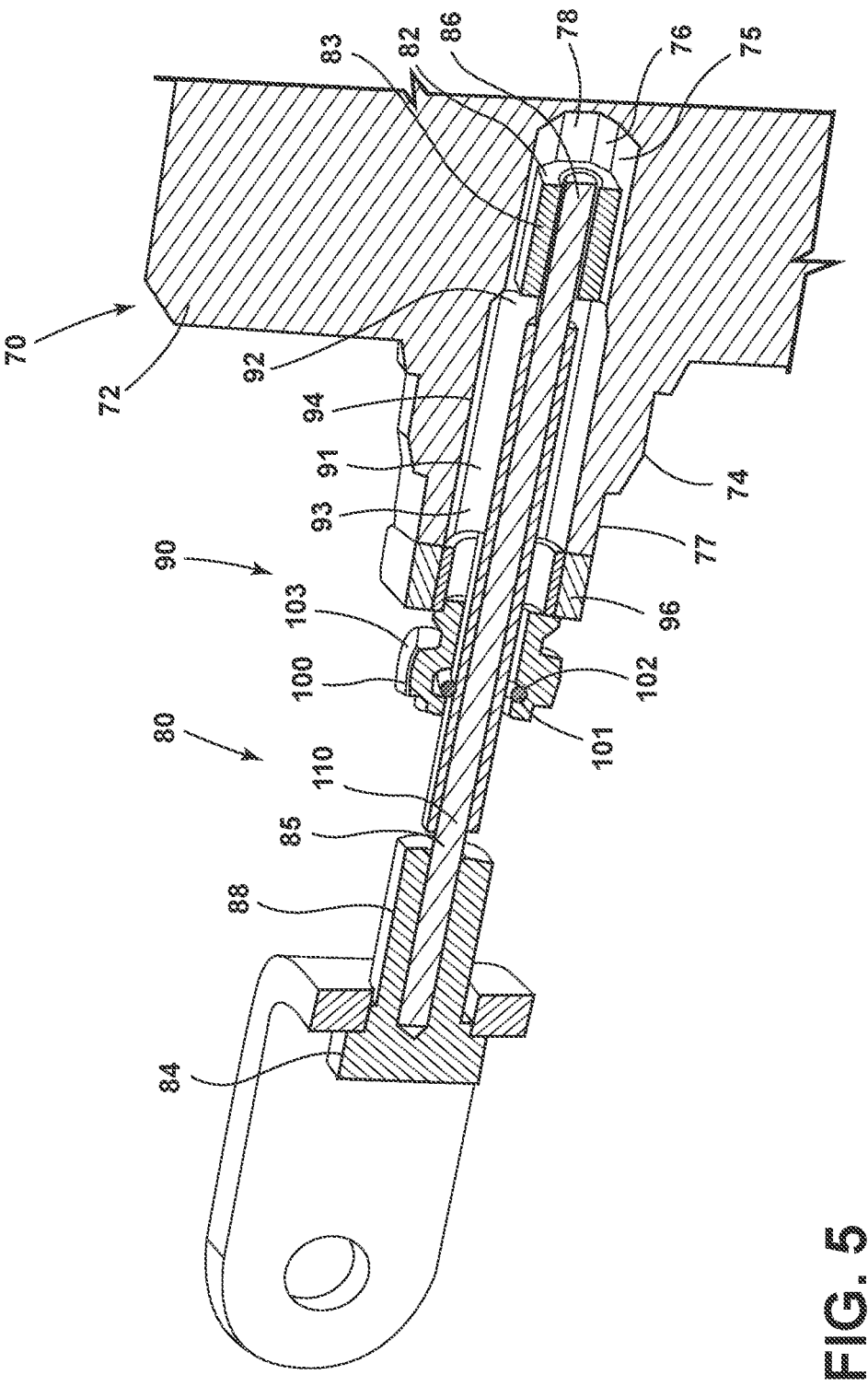
FIG. 5 illustrates a cross-sectional view of the auxiliary braking system shown in FIG. 4.

FIGS. 4 and 5 illustrate differing view of the auxiliary braking assembly 56 in accordance with the present subject matter. More specifically, FIG. 4 illustrates a partial, exploded perspective view of the auxiliary braking system 56. FIG. 5 illustrates a cross-sectional view of the auxiliary braking system 56 shown in FIG. 4. As mentioned above, the auxiliary braking system 56 includes the auxiliary braking actuator 70, which is configured to actuate the brake valve 66 associated with the braking assembly(ies) 60. Specifically, in several embodiments, the auxiliary braking actuator 70 includes a rod 74 having a first end 75 and second end 77 opposed to the first end 75. As shown, the first end 75 of the rod 74 extends outward from the auxiliary braking actuator 70 and defines a chamber 76 therein. Moreover, the first end 75 of the rod 74 is coupled to the cable assembly 80. In this respect, when activated, the rod 74 moves relative to the auxiliary braking actuator 70 such that the cable assembly 80 transmits this movement to the brake valve 66.

In the illustrated embodiment, the auxiliary braking actuator 70 is configured as a pneumatically actuated spring-loaded cylinder 72. In such embodiments, to initiate auxiliary braking operations, a pneumatic force is applied to the spring-loaded cylinder 72. When the pneumatic force is applied to the spring-loaded cylinder 72, the rod 74 extends or retracts relative to the spring-loaded cylinder 72, thereby moving the cable assembly 80 in a manner that pivots the actuation arm 65 (FIG. 3) of the brake valve 66 (FIG. 3). However, it should be appreciated that the auxiliary braking actuator 70 corresponds to any other suitable hydraulic, pneumatic, mechanical, and/or electrical components configured to apply a force to the cable assembly 80.

In some embodiments, the auxiliary braking actuator 70 is automatically controlled without human intervention by a computing system (e.g., one or more controllers (not shown)). In such embodiments, the computing system may receive an input or other data indicating that an auxiliary braking operation should be performed (e.g., sensor data indicating that the work vehicle 10 is parked on a hill). Thereafter, the computing system may transmit control signals to the auxiliary braking actuator 70 or an associated valve(s) (not shown). Such control signals, in turn, instruct the auxiliary braking actuator 70 or the associated valve(s) to move the rod in a manner that actuates the brake valve 66.

Furthermore, as mentioned above, the auxiliary braking system 56 includes the cable assembly 80. As shown, the cable assembly 80 includes a first end 82 and a second end 84 opposed to the first end 82. More specifically, the first end 82 includes a first enlarged head 83 that is slidably positioned within the chamber 76. As will be described below, the first enlarged head 83 of the cable assembly 80 is slideably positioned within the chamber 76 (FIG. 5) of the auxiliary braking actuator 70 such that when a service braking actuator (not shown) activates the brake assembly 60, the first enlarged head 83 is configured to slide within the chamber 76 (FIG. 5) of the auxiliary braking actuator 70. Furthermore, the second end 84 of the cable assembly 80 is coupled to the clevis 64 of the brake assembly 60 and the first end 82 of the cable assembly 80 including a first enlarged head 83. For example, in the illustrated embodiment, the second end 84 of the cable assembly 80 includes a second enlarged head 88 coupled to the clevis 64. However, in alternative embodiments, the second end 84 of the cable assembly 80 may be coupled to the brake valve 66 in any other suitable manner.

Additionally, in the illustrated embodiment, the cable assembly 80 is configured as a Bowden cable 110. In such an embodiment, the cable assembly 80 includes a cable 85 positioned within a sheath 112. As such, the cable 85 includes a first end 86 and an opposed second end 87. In this respect, the first enlarged head 83 encloses the first end 86 of the cable 85. Similarly, the second enlarged head 88 encloses the second end 87 of the cable 85. However, in alternative embodiments, the cable assembly 80 may be configured in any other suitable manner that allows for the cable assembly 80 to transmit the movement of the auxiliary braking actuator 70 to the brake valve 66.

Figure 7:
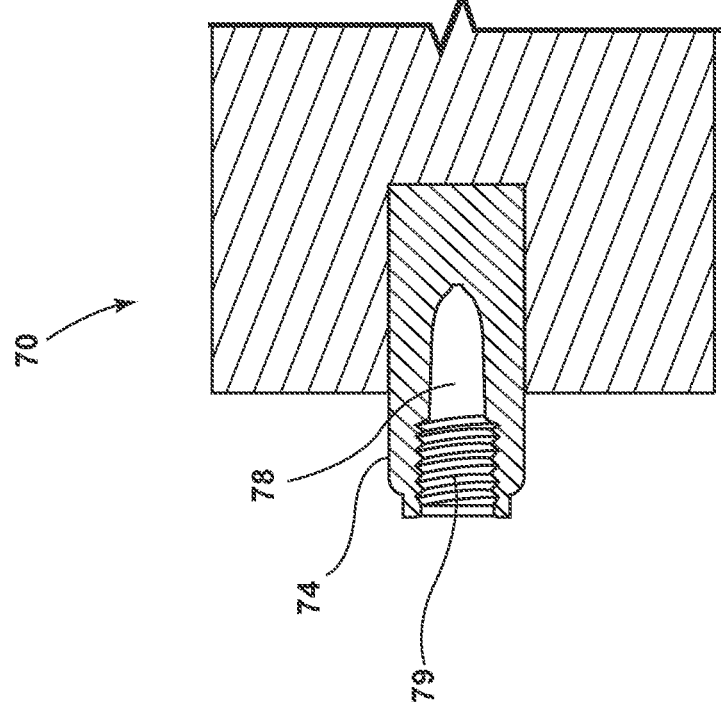
FIG. 7 illustrates another enlarged, partial cross-sectional view of the auxiliary braking actuator shown in FIGS. 4-6, particularly illustrating threading of a rod of the auxiliary braking actuator.

Moreover, in some embodiments, the auxiliary braking system 56 includes a fastener assembly 90. In general, the fastener assembly 90 is configured to couple to the rod 74 to retain the first enlarged head 83 within the chamber 76 of the auxiliary braking actuator 70. For example, in the illustrated embodiment, the fastener assembly 90 includes a sleeve 91 positioned around a portion of the cable assembly 80. The sleeve 91 includes a first end 92 and a second end 93. The first end 92 of the sleeve 91 positioned within the chamber 76 to retain the first enlarged head 83 within the chamber 76. For example, in one embodiment, the sleeve 91 may have an outer surface 94 defining threading 95. Similarly, as shown in FIG. 7, an inner surface 78 of the rod 74 defines threading 79. As such, the outer surface 94 of the sleeve 91 is configured to threadingly engage with an inner surface 78 of the rod 74. Additionally, the fastener assembly 90 may include a nut 96 that threadingly engages the outer surface 94 of the sleeve 91. Thus, by varying the position of the nut 96 along the outer surface 94 of the sleeve 91, the size of the chamber 76 can be adjusted.

Referring again to FIGS. 4 and 5, as mentioned above, the fastener assembly 90 couples the rod 74 and the cable assembly 80 together. In this respect, the cable assembly 80 is configured to transmit the force applied by the rod 74 to the brake valve 66 when an auxiliary braking operation is initiated.

Further in the illustrated embodiment, the auxiliary braking system 56 includes a seal member 101 coupled between the second end 93 of the sleeve 91 and the cable assembly 80 and configured to seal the chamber 76. The seal member 101 is used to prevent dirt and other foreign particles from entering the auxiliary braking actuator 70. In one embodiment, the second end 93 of the sleeve 91 defines an enlarged portion 100 containing the seal member 101. In one further embodiment, the seal member 101 is configured as O-ring 102. In still one further embodiment, the enlarged portion 100 is a hexagonal head 103.

Figure 6:
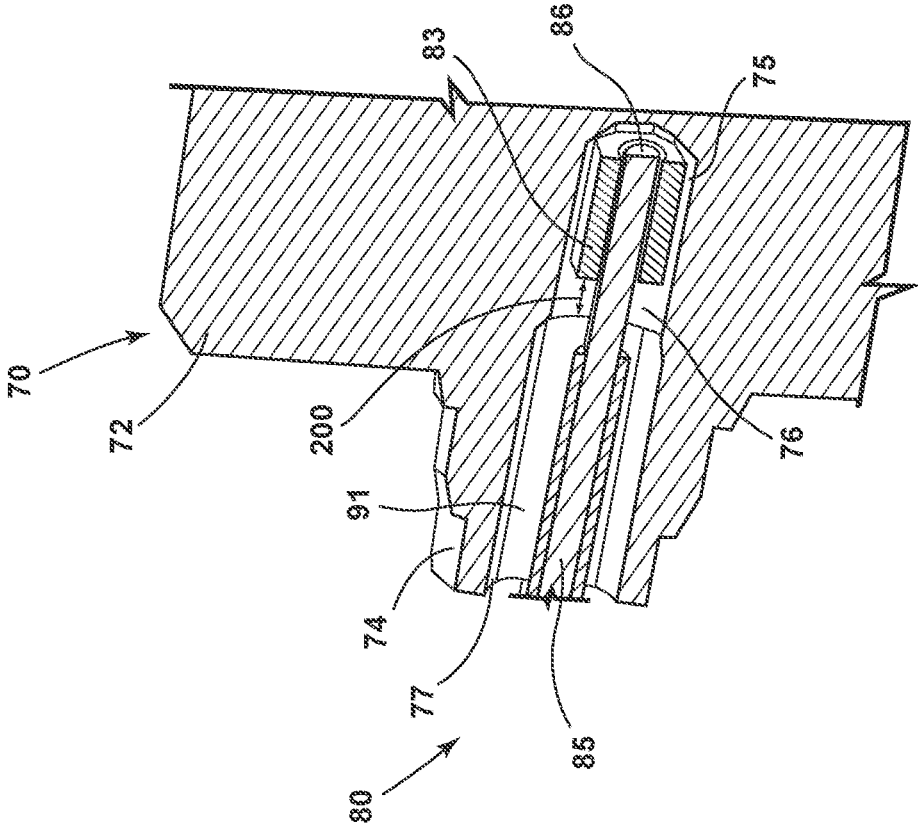
FIG. 6 illustrates an enlarged, partial cross-sectional view of the auxiliary braking system shown in FIGS. 4 and 5, particularly illustrating a chamber of an auxiliary braking actuator of the auxiliary braking system.

FIG. 6 illustrates an enlarged cross-sectional view of the FIG. 4 embodiment the auxiliary braking system 56. As mentioned above, the first enlarged head 83 is positioned within the chamber 76 defined in the rod 74. Moreover, the first enlarged end 83 and the first end 86 of the cable 85 are configured to slide, as indicated by arrow 200, within the chamber 76 of the rod 74 during service braking operations. More specifically, during service braking operations, the brake valve 66 is activated such that the cable 85 of the cable assembly 80 moves relative to the rod 74. In this respect, the chamber 76 provides clearance for the cable 85 and the first enlarged head 83 coupled thereto to move relative to the rod

74. Thus, the positioning of the first enlarged head 83 within the chamber 74 allow for the auxiliary braking actuator 70 to be unaffected by the actuation of the brake valve 66 or other components of the braking assembly 60 during service braking operations. Additionally, the sleeve 91 of the fastener assembly 90 is configured to confine the movement of the first enlarged head 83 and the first end 86 of the cable 85 within the chamber 76 of the rod 74 of the spring-loaded cylinder 72 as seen in the illustrated embodiment. During auxiliary braking operations, a force activates the brake assembly 60 (FIG. 3) such that the brake assembly 60 applies a force to the cable assembly 80. The force applied to the cable assembly 80 moves the first enlarged head 83 and the first end 86 of the cable 85 within the chamber 76 toward the first end 75 of the rod 74.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. An auxiliary braking system for a work vehicle, the auxiliary braking system comprising:
   a brake assembly;
   an auxiliary braking actuator configured to selectively activate the brake assembly during auxiliary braking operations, the auxiliary braking actuator including a rod having a first end and second end opposed to the first end, the first end of the rod defining a chamber;
   a cable assembly including a first end and a second end opposed to the first end, the second end of the cable assembly coupled to the brake assembly, the first end of the cable assembly including a first enlarged head slidably positioned within the chamber; and
   a fastener assembly comprising a sleeve positioned around at least a portion of the cable assembly, the sleeve including a first end and a second end opposed to the first end, the first end being positioned within the chamber to retain the first enlarged head within the chamber,
   wherein, when the brake assembly is activated during service braking operations, the first enlarged head is configured to slide within the chamber.

2. The auxiliary braking system of claim 1, wherein an outer surface of the first end of the sleeve threadingly engages an inner surface of the rod.

3. The auxiliary braking system of claim 2, wherein the fastener assembly further comprises a nut that threadingly engages an outer surface of the sleeve.

4. The auxiliary braking system of claim 3, the second end of the cable assembly including a second end of the cable and a second enlarged head, wherein the second enlarged head encloses the second end of the cable.

5. The auxiliary braking system of claim 4, the first end of the cable assembly further including a first end of the cable, wherein the first enlarged head encloses the first end of the cable.

6. The auxiliary braking system of claim 1, further comprising:
   a seal member coupled between the second end of the sleeve and the cable assembly, the seal member configured to seal the chamber.

7. The auxiliary braking system of claim 6, the second end of the sleeve defining an enlarged portion containing the seal member.

8. The auxiliary braking system of claim 6, wherein the seal member comprises an o-ring.

9. The auxiliary braking system of claim 6, wherein the cable assembly comprises a Bowden cable.

10. The auxiliary braking system of claim 1, wherein the brake assembly comprises a clevis coupled to the second end of the cable assembly.

11. A work vehicle, comprising:
   a traction device;
   a brake assembly configured to slow movement of the traction device;
   a service braking actuator configured to activate the brake assembly during service braking operations;
   an auxiliary braking actuator configured to selectively activate the brake assembly during auxiliary braking operations, the auxiliary braking actuator including a rod having a first end and a second end opposed to the first end, the first end of the rod defining a chamber; and
   a cable assembly including a first end and a second end opposed to the first end, the second end of the cable assembly coupled to the brake assembly, the first end of the cable assembly including a first enlarged head slidably positioned within the chamber, the cable assembly further including a fastener assembly comprising a sleeve positioned around at least a portion of the cable assembly, the sleeve including a first end and a second end opposed to the first end, the first end being positioned within the chamber to retain the first enlarged head within the chamber,
   wherein, when the brake assembly is activated during service braking operations, the first enlarged head is configured to slide within the chamber.

12. The work vehicle of claim 11, wherein an outer surface of the first end of the sleeve threadingly engages an inner surface of the rod, and the fastener assembly further comprises a nut that threadingly engages an outer surface of the sleeve.

13. The work vehicle of claim 12, the second end of the cable assembly including a second end of the cable and a second enlarged head, wherein the second enlarged head encloses the second end of the cable, and the first end of the cable assembly further including a first end of the cable, wherein the first enlarged head encloses the first end of the cable.

14. The work vehicle of claim 11, further comprising:
   a seal member coupled between the second end of the sleeve and the cable assembly, the seal member configured to seal the chamber.

15. The work vehicle of claim 14, the second end of the sleeve defining an enlarged portion containing the seal member.

16. The work vehicle of claim 14, wherein the seal member comprises an o-ring.

17. The work vehicle of claim 14, wherein the cable assembly comprises a Bowden cable.

18. The work vehicle of claim 11, wherein the brake assembly comprises a clevis coupled to the second end of the cable assembly.

* * * * *